United States Patent
Peleska

(10) Patent No.: US 11,479,153 B2
(45) Date of Patent: Oct. 25, 2022

(54) CHILD SEAT FOR ATTACHING TO A MOTOR VEHICLE SEAT

(71) Applicant: CYBEX GmbH, Bayreuth (DE)

(72) Inventor: Franz Peleska, Vienna (AT)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 17/277,184

(22) PCT Filed: Sep. 5, 2019

(86) PCT No.: PCT/EP2019/073645
§ 371 (c)(1),
(2) Date: Mar. 17, 2021

(87) PCT Pub. No.: WO2020/057984
PCT Pub. Date: Mar. 26, 2020

(65) Prior Publication Data
US 2022/0055503 A1    Feb. 24, 2022

(30) Foreign Application Priority Data

Sep. 17, 2018   (DE) .................... 20 2018 105 300.0

(51) Int. Cl.
*B60N 2/28*   (2006.01)
*B60N 2/90*   (2018.01)

(52) U.S. Cl.
CPC ............. *B60N 2/2809* (2013.01); *B60N 2/90* (2018.02); *B60N 2002/981* (2018.02)

(58) Field of Classification Search
CPC ...... B60N 2/2809; B60N 2/2887; B60N 2/90; B60N 2002/948; B60N 2002/981
(Continued)

(56) References Cited

U.S. PATENT DOCUMENTS

| 2004/0041450 A1* | 3/2004 | Yamaoka | B60N 2/803 297/254 |
| 2011/0193394 A1* | 8/2011 | Stiyer | B60N 2/2809 297/463.1 |

(Continued)

FOREIGN PATENT DOCUMENTS

| DE | 202012007314.1 U1 | 9/2012 |
| DE | 202012007313.3 U1 | 11/2012 |

(Continued)

OTHER PUBLICATIONS

"International Application No. PCT/EP2019/073645, International Search Report and Written Opinion dated Nov. 20, 2019", (Nov. 20, 2019), 17 pgs.

*Primary Examiner* — Milton Nelson, Jr.
(74) *Attorney, Agent, or Firm* — Schwegman Lundberg & Woessner, P.A.

(57) ABSTRACT

The invention relates to a child seat for attaching to a motor vehicle seat, comprising a first anchor for anchoring the child seat and/or a seat unit of the child seat, and a second anchor for anchoring the child seat and/or the seat unit of the child seat, wherein the first anchor forms an upper anchor and the second anchor forms a lower anchor or the first anchor forms a lower anchor and the second anchor forms an upper anchor, wherein the first anchor is designed such that it can adopt at least one first and a second configuration, wherein, when the first anchor assumes the first configuration, an anchoring of the second anchor is blocked by the first anchor.

13 Claims, 5 Drawing Sheets

Figure 1:
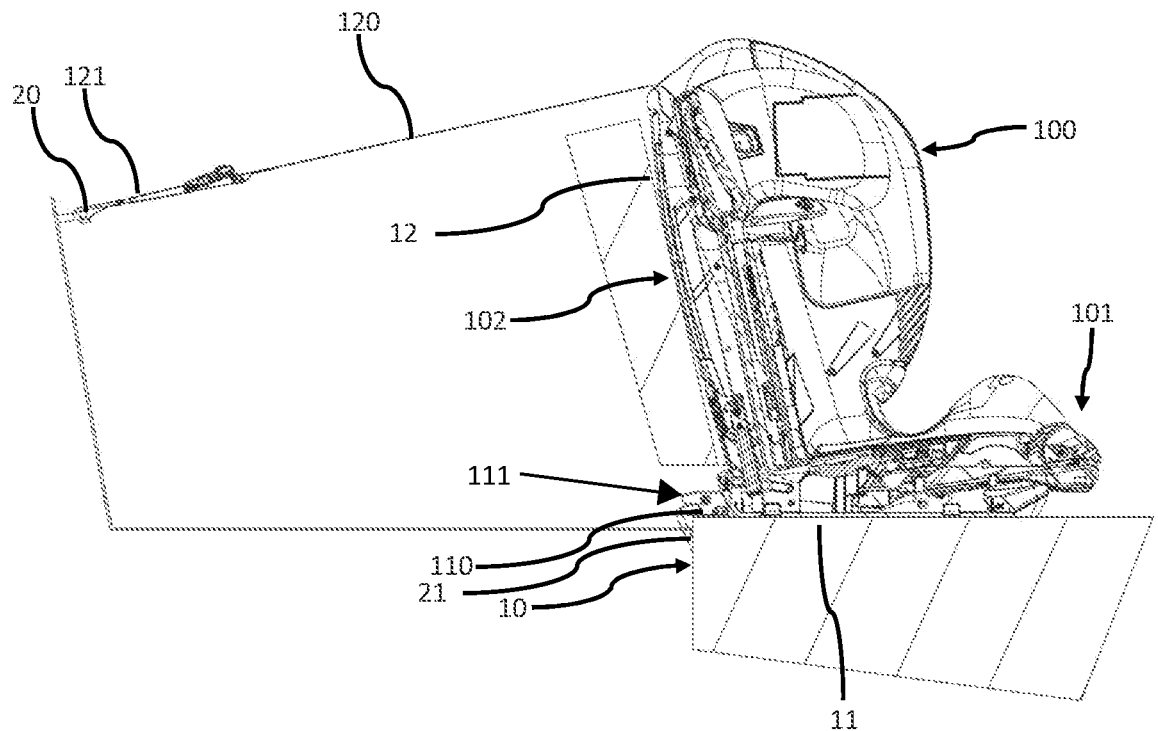

(58) Field of Classification Search
USPC .......................................................... 297/253
See application file for complete search history.

(56) References Cited

U.S. PATENT DOCUMENTS

2017/0236395 A1* 8/2017 Cech ...................... B60N 2/002
  340/449
2019/0308584 A1* 10/2019 Eaton ...................... B60R 22/28

FOREIGN PATENT DOCUMENTS

| EP | 0714806 A2 | 6/1996 |
| EP | 2072325 A2 | 6/2009 |
| EP | 3256343 A1 | 12/2017 |
| FR | 2861658 A1 | 5/2005 |
| WO | WO-2020057984 A1 | 3/2020 |

* cited by examiner

CHILD SEAT FOR ATTACHING TO A MOTOR VEHICLE SEAT

PRIORITY CLAIM TO RELATED APPLICATIONS

This application is a U.S. national stage filing under 35 U.S.C. § 371 from International Application No. PCT/EP2019/073645, filed on Sep. 5, 2019, and published as WO2020/057984 on Mar. 26, 2020, which claims the benefit under 35 U.S.C. 119 to German Application No. 20 2018 105 300.0, filed on Sep. 17, 2018, the benefit of priority of each of which is claimed herein, and which applications and publication are hereby incorporated herein by reference in their entirety.

The invention relates to a child seat for attaching to a motor vehicle seat according to claim 1.

In the prior art, child seats for attaching to a motor vehicle seat are generally known. It is further known that such child seats can be anchored to or in the motor vehicle, for example by upper anchoring means (e.g. top tether) and lower anchoring means (e.g. Isofix). There is a risk that an anchoring means (e.g. the top tether) is not installed correctly, for example is not fastened or is not sufficiently tensioned. In the event of an accident, this implies an increased risk of injury.

DE 20 2012 007 314 U1 discloses a child seat with a top tether and an indicator element, whereby the indicator element is clearly visible when the top tether is not correctly installed and not visible when the top tether is correctly installed. Here, therefore, an indicator is intended to reduce or prevent the risk of misuse. However, misuse is ultimately not prevented.

DE 20 2012 007 313 U1 describes a child seat with a top tether and a movable element, whereby the movable element is intended to interfere with the seating of a child into the child seat when the top tether is not correctly installed and is not intended to interfere when the top tether is correctly installed. This is a comparatively complex solution, which is also not uncritical. In the rebound after a frontal impact, the top tether no longer has any tension and the movable element is transferred back into the interfering position.

FR 2 861 658 A1 describes a child seat with a top tether and lower fastening means, whereby a warning signal is emitted if only either top tether or the lower fastening means are correctly installed. If neither top tether nor lower fastening means or both systems are correctly installed, no warning is given. However, especially if the lower fastening means is an Isofix anchorage, this solution is comparatively complicated and laborious, as Isofix latches are usually designed to be movable and thus the connection of the sensors in the Isofix latches must follow the movement.

EP 3 256 343 A1 describes a child seat with a seat area and a backrest, whereby the child seat can be transferred from a compact configuration in which the seat area is folded against the backrest to a use configuration in which a child can sit in the child seat and back. The child seat further has a top tether, and in one embodiment the transfer from the compact configuration to the use configuration can only occur when the top tether is secured and sufficiently tensioned. This is a comparatively complex solution, which is also only applicable to a certain type of child seat (e.g. not to baby shells).

The object of the invention is to propose a simple, inexpensive and yet safe solution for ensuring that the child seat is anchored as correctly as possible. In particular, the user of the child seat should be reliably reminded of the correct installation of an anchoring means (in particular the upper anchoring means).

This object is preferably solved by the features of claim 1.

In particular, the task is solved by a child seat for attaching to a motor vehicle seat, comprising a first anchoring means for anchoring the child seat (to the vehicle) and/or a seat unit of the child seat (to a base) and a second anchoring means for anchoring the child seat (to the vehicle) and/or a seat unit of the child seat (to a base). The first anchoring means is preferably an upper anchoring means and the second anchoring means is preferably a lower anchoring means. Alternatively, the first anchoring means may form a lower anchoring means (preferably for anchoring the child seat to the vehicle) and the second anchoring means may form an upper anchoring means (preferably for anchoring the child seat to the vehicle and/or for anchoring the seat unit to the base). The first anchoring means is preferably configured such that it can assume at least a first and a second configuration, wherein when the first anchoring means assumes the first configuration, an anchoring (or anchoring possibility, in particular in the sense of a state in which the corresponding anchoring means can actually fulfil its anchoring function) of the second anchoring means is blocked.

A core idea of the invention lies in that the first anchoring means is reconfigurable and the respective configuration is causally related to the extent to which the second anchoring means can act (anchoringly) (i.e. can form an anchorage). The causal relationship can be indirect or direct. By an indirect relationship (interaction) is to be understood in particular that the blocking does not result from a (physical) contact between the first and second anchoring means, but is transmitted, for example by a transmission device, in which configuration the first anchoring means is and accordingly the second anchoring means is blocked (by a separate blocking device, for example) or not. By a direct relationship or direct interaction (a direct blocking) is to be understood in particular that the first anchoring means is in physical contact with the second anchoring means, for example is in engagement with at least a portion of the second anchoring means.

First and second anchoring means preferably respectively form a first and second anchoring device. First and/or second anchoring means may (each) form an independent assembly and/or (optionally each) have a weight which is less than 10%, preferably less than 5%, of the total weight of the child seat. Parts forming seating surfaces of the child seat (such as a seat area or a backrest per se) are preferably not part of the (respective) anchoring means. The first and/or second anchoring means can alternatively also be formed from several assemblies (at least or exactly two assemblies in each case).

An anchoring (or blocking thereof) preferably does not imply that a seat area is pivoted (or possibly otherwise adjusted) with respect to a backrest. In general, a seat area relative to a backrest may or be pivotable (optionally adjustable in a different manner) or not (for example, be rigidly connected to the backrest).

A blocking or prevention of the anchoring (anchoring possibility) means in particular that a (fixed) anchoring is impossible or at least (significantly) impeded, e.g. by the fact that then another actuating means must be actuated and/or a (manual) access to the respective anchoring means is restricted.

By an upper anchoring means is meant in particular an anchoring means which is partially or completely arranged (held or at least looped around) in an upper region of the child seat or seat unit (for example within the uppermost 50%, preferably uppermost 20%; if the height of the child seat or seat unit is variable, this applies in particular to that (use-) configuration of the child seat in which the maximum height is reached). If the upper anchoring means comprises a top tether, this may be held or at least looped around in the upper region of the seat. Specifically, a top tether belt may be (at the top) looped around and guided down inside the seat. Optionally, a guide can be realised down to the (very) bottom (in which case the top tether can be attached to the lower anchoring means, especially if this has to be structurally loadable anyway). The upper anchoring means, in particular the top tether, can optionally be detachably arranged/held. The upper anchoring means may possibly extend between an upper retaining or deflection point and an anchoring point on the vehicle, whereby this anchoring point may e.g. be located on the vehicle floor (i.e. possibly even below the lower anchoring means).

By a lower anchoring means is preferably meant an anchorage means which is (partially or completely) arranged (held or at least looped around) in a lower region of the child seat, respectively of the seat unit (for example arranged in the lower 50%, preferably lower 20%; if the height of the child seat, respectively of the seat unit is variable, this applies in particular to that (use-) configuration of the child seat in which the maximum height is reached).

In any case, the upper anchoring means may be located (at least predominantly, preferably completely) above the lower anchoring means (at least as far as its point of attachment to the child seat or seat unit is concerned). An arrangement of the upper anchoring means (i.e. in particular the point at which the upper anchoring means is arranged or attached to the child seat or seat unit) may be at least 10 cm, preferably at least 30 cm, still more preferably at least 50 cm above an arrangement of the lower anchoring means (in the case of child seats or seat units which can be adjusted to different heights, this preferably applies at least to the configuration in which the child seat or seat unit has the greatest height).

Particularly preferably, the upper anchoring means is a top tether and the lower anchoring means is an Isofix anchorage.

The child seat may be designed with or without a base (part). When the child seat is formed with a base, the child seat preferably comprises a seat unit configured (releasably and/or adjustably, for example rotatably) relative to the base. The seat unit then preferably comprises the actual seat, i.e. in particular a seat area and a backrest (which, for example in the form of a baby shell, do not necessarily have to be structurally separated from each other).

The child seat or seat unit can generally be designed with structurally separated seat area and backrest. Seat area and backrest may or may not be adjustable (e.g. pivotable) relative to each other. The child seat may be a baby shell or a "classic" child seat for older children. In particular, if the seat is designed as a baby shell, it may possibly comprise (only) a one-piece shell to accommodate the baby or child and its own harness system, possibly a headrest and possibly other components.

Insofar as the backrest (back area) and seat area are structurally separated from each other, this separation can be defined, for example, by a bend (or similar).

By the fact that a use of the second anchoring means is preferably causally dependent on a configuration of the first anchoring means, the risk for operating errors can at least be reduced. In the general case, it is at least achieved (preferred constellations are described further below) that the user in at least one configuration of the first anchoring means is made aware in the first place that this particular configuration is given (namely by blocking the action of the second anchoring means). This promotes (even in the most general case) at least the user's awareness that different configurations may be relevant at all with regard to the first anchoring means (or that the first anchoring means "exists" at all). This at least increases the probability that the first anchoring means is used (correctly). This is particularly advantageous if the second anchoring means per se is sufficient or at least suggests that with anchorage of the second anchoring means a sufficient (safe) anchorage of the child seat or seat unit is realised.

First and second anchoring means may be structurally separated from each other (so that a connection is created, for example, only via a seat shell or backrest and/or seat area, but no direct connection is present) and/or functionally separated from each other (apart from the interaction between the configuration of the first anchoring means on the one hand and the blocking or non-blocking of the action of the second anchoring means on the other hand). Preferably, the first and second anchoring means are not connected to each other by a belt.

Preferably, the first anchoring means may assume a third configuration. In the third configuration of the first anchoring means, an anchorage (or effect) of the second anchoring means is preferably not blocked (the third configuration thus preferably corresponds to the second configuration in this respect). Irrespective of whether a third configuration is present, the second configuration is preferably a configuration of the first anchoring means in which an anchoring or effect of the second anchoring means is not/will not be blocked.

The second anchoring means may be configured such that it can assume at least a first and a second configuration. Therein, the first configuration preferably corresponds to a non-use configuration in which the second anchoring means do not anchor the child seat or the seat unit, and/or the second configuration preferably corresponds to a use configuration in which the second anchoring means anchors the child seat or the seat unit.

Furthermore, the second anchoring means may optionally assume a third configuration. In the third configuration of the second anchoring means, preferably an anchoring of the second anchoring means is enabled (but possibly not realised). By enabling an anchoring of the second anchoring means it is to be understood that the latter is configured such that an anchoring can be carried out by the user (by connecting the second anchoring means to its installation location or corresponding installation locations), i.e. the second anchoring means is not fundamentally configured (constituted) such that such a (fixed) connection or fastening is prevented.

First and/or third configuration of the first and/or second anchoring means are preferably non-use configurations. By a non-use configuration it is preferably meant that the anchoring means is configured to be non-anchored or not has an anchoring effect. The second configuration of the first and/or second anchoring means is preferably a use configuration, in particular in the sense that the anchoring means is actually anchored or has an anchoring effect.

Under a configuration of the respective anchoring means an inherent state of the anchoring means may be understood (for example, a mechanical tension inherent in the anchoring means and/or a position of components of the respective anchoring means with respect to each other) and/or a state of the respective anchoring means with respect to a component outside the anchoring means (for example, another component of the child seat and/or the seat unit and/or the vehicle). If the different configurations are configurations defined by a position with respect to the vehicle or another component to be considered external with respect to the child seat, this may imply that at least one corresponding sensor device of the child seat per se indicates these different positions, so that these different configurations/positions are detectable on the child seat itself and/or the seat unit itself.

The child seat may have a first (rear or upper) portion for abutment against a backrest of the vehicle and a second (lower) portion for abutment against a seating surface of the vehicle seat. Preferably, both the at least one first (upper) anchoring means and the at least one second (lower) anchoring means may each be either in a first configuration (non-use configuration) in which the corresponding anchoring means does not fasten the child seat to the vehicle or in a second configuration (use configuration) in which the corresponding anchoring means does fasten the child seat to the vehicle. Preferably, the at least one first (upper) anchoring means in its first configuration prevents transition of the at least one second (lower) anchoring means from the first configuration to the second configuration, whereby further preferably, the at least one first (upper) anchoring means may further assume a third configuration in which it neither fastens the child seat to the vehicle nor prevents transition of the at least one second (lower) anchoring means. Thus, for the installation of the child seat (or seat unit), it should in particular be ensured that the at least one first (upper) anchoring means is not in the first configuration.

The first anchoring means preferably comprises (or is configured as) a harness and/or a top tether. The top tether preferably comprises a belt, an element for connection to the vehicle, e.g. a hook, and possibly indicators. First and second configuration of the first anchoring means may then preferably each be characterised by a (minimum) tension of the belt (if applicable of the belt of the top tether) (in particular with respect to a/the third configuration). In the first and/or second configuration, for example, a (mechanical) tension value of the belt (at a certain location) may be above (or possibly, according to a first alternative, at) a threshold value. Similarly, a/the third configuration may be characterised by being below (or possibly, according to a second alternative, at) the threshold value.

The first anchoring means may be arranged (with a proximal end) in particular at or near the upper end of the child seat or seat unit (in particular attached and/or looped around). Furthermore, the first (upper) anchoring means (in particular at a distal end) may comprise at least a first fastening means able to act in combination with a first counterpart located in/on the vehicle or base (to ultimately realise the anchoring).

The second anchoring means may comprise an anchorage with at least one anchoring arm, in particular an Isofix anchorage. More specifically, the at least one second (lower) anchoring means may comprise two (rigid) anchoring arms, at the ends of which second fastening means are provided, which may act in combination with second counterparts located on the vehicle or on the base. In particular, these may be Isofix arms.

In embodiments, the at least one anchoring arm (the at least or exactly two anchoring arms) may be mounted slidable towards and away from the backrest (of the child seat or seat unit) in guide elements provided for this purpose on the underside of the child seat (or seat unit), wherein the first configuration of the anchoring arm (the anchoring arms) preferably corresponds to a position retracted into the child seat (away from the backrest of the vehicle seat), in which further preferably the second fastening means cannot act in combination with the second counterpart (or the at least on second counterparts). The second configuration of the at least one anchoring arm (the anchoring arms) may correspond to a position extended towards the backrest of the vehicle seat, in which the second fastening means are able to act in combination with the at least one second (or, if applicable, the two second) counterpart(s).

The anchoring arms (Isofix arms) may be interconnected to move together (towards or away from the vehicle seat backrest or base) if necessary, but this need not be the case.

The first (upper) anchoring means may preferably, in its first configuration, prevent the movement of at least one anchoring arm (the at least one anchoring arm) from its first position or configuration (and into its second or third position or configuration). For this purpose, the first fastening means of the first (upper) anchoring means may, for example, engage a guide element of at least one anchoring arm (the at least one anchoring arm), so that a movement of the corresponding anchoring arm out of the first configuration is blocked. Preferably, in the second or third configuration of the second anchoring means (the lower anchoring elements), the anchoring arm (the anchoring arms) blocks an engagement position for the (at least one) first fastening means into the guide element(s).

In alternative embodiments, the first configuration of the second (lower) anchoring means may preferably be achieved by the (at least one) first fastening means of the second (upper) anchoring means directly engaging in at least one of the second fastening means (of the respective anchoring arm), thus preventing the corresponding second fastening means from engaging with the associated second counterpart.

In embodiments, the second anchoring means may comprise a belt anchorage. By a belt anchorage is meant, in particular, a device comprising and/or adapted to receive (guide) a belt (portion). In particular, the belt anchorage may thus comprise a belt guide and/or a belt. Specifically, the belt anchorage may be configured for (or as) a latch system.

More specifically, the second (lower) anchoring means may comprise a belt guide designed to guide at least one belt for attaching the child seat to a vehicle seat (or the seat unit at the base). This belt can be a vehicle's own belt (lap belt section and/or diagonal belt section) or also a belt belonging to the child seat, for example corresponding to the latch system. When first (upper) and second (lower) anchoring means are in their (respective) first configuration, the first fastening means of the first (upper) anchoring means can preferably engage in a receptacle provided for this purpose in the belt guide, in order to block the reception of the belt in the belt guide. Preferably, it should no longer be possible (prevented) for the first fastening means (of the first/upper anchoring means) to engage in the receptacle of the belt guide after the belt has been received in the belt guide.

In embodiments, the child seat is a seat that is not (detachably) attached to a base, but is (directly) attached to the vehicle or vehicle seat.

The child seat may also comprise a seat unit and a base, wherein first (upper) and second (lower) anchoring means are preferably (each) attached to the base in preferred embodiments. In such embodiments, the seat unit may comprise seat attachment means, optionally independent of the first (upper) and second (lower) anchoring means, for (detachably) fastening the seat unit to the base.

Furthermore, the child seat may also comprise a seat unit and a base, wherein the at least one first (upper) anchoring means is located on the seat unit and the second (lower) anchoring means may be realised by seat fastening means for (detachably) fastening the seat unit to the base. Further fastening means may then be provided, if necessary, for fastening the base to the vehicle (or vehicle seat). In this context, when first (upper) and second (lower) anchoring means are in their first configuration, the at least one first fastening means (of the first/upper anchoring means) can preferably directly engage the second (lower anchoring means) and prevent or block its acting in combination with a corresponding counterpart (corresponding counterparts). For example, the second (lower) anchoring means may comprise at least one rod, wherein the at least one associated counterpart may comprise at least one snap hook (or vice versa).

Preferably, at least one sensor means, further preferably at least one contact switch, still further preferably at least one toggle switch, is provided for determining whether the respective anchoring means is in a particular configuration. Particularly preferably, the sensor means is configured to determine whether the first (upper) anchoring means is in the third configuration. Alternatively or additionally, the sensor means may also be configured (or further corresponding sensor means may be provided) to determine whether the first and/or the second anchoring means is/are in the first and/or second configuration. If such information can be obtained by the sensor means, overall safety is improved. For example, a determination that the first (upper) anchoring means is in its third configuration (in which in particular it allows anchoring by the second anchoring means, but does not itself effect anchoring or does not effect fixed anchoring) can be used for a corresponding evaluation and/or indication (in particular for a corresponding alarm device, as explained further below).

Specifically, the sensor means may be a sensor means that is configured to detect the presence of a predefined mechanical (minimum) tension. According to the embodiment, the sensor means can act as a switch, preferably a contact switch, even more preferably a toggle switch, which triggers in particular when the predefined (minimum) tension is exceeded and/or undershot. If an alarm device is provided, the sensor means (the switch) can preferably (directly) switch the alarm device on and/or off so that it generates or no longer generates an alarm (or other) indication. Of course, in principle, other types of sensor means are also suitable for controlling the alarm device, whereby the control can also be purely electronic.

In specific embodiments, a belt (section) of the first (upper) anchoring means may be associated with a spring, in particular a torsion or leg spring. A first leg of the leg spring is then preferably supported or mounted on the belt (section) (e.g. via a bracket section or a section which runs at least substantially parallel to an axis of rotation of the torsion or leg spring), and a second leg is supported or mounted in a stationary manner with respect to a main body of the child seat or seat unit and/or on the sensor means (switch). A spring constant or a force required to actuate the sensor means (switch) are then preferably matched so that the belt (section) is forced to a detour by the first leg when the (minimum) tension is not applied. However, if the (minimum) tension is exceeded, this leads to a force on the first leg, which is transmitted by the spring and acts on the sensor means (switch) by means of the second leg, so that this switches off the alarm device. If the tension falls below the (minimum) tension again, the alarm device can be switched on again, if necessary, by the reverse process.

Preferably, an alarm device is provided which is further preferably configured to generate an alarm if (possibly only in this case) the first anchoring means is in its third configuration, which is in particular set as a non-use configuration. The alarm may be, for example, an acoustic alarm and/or a visual alarm. A visual alarm may comprise coloured, in particular red and green, indicator elements and/or illuminating means (e.g. LEDs).

The first anchoring means may be configured to anchor the child seat to the vehicle and/or to anchor a seat unit (of a child seat with base) to the base. Alternatively or additionally, the same may apply to the second anchoring means. If a base is provided, the first anchoring means may anchor the base (and thus indirectly the seat unit) to the vehicle or anchor the seat unit (and thus indirectly the base) to the vehicle. Alternatively or additionally, the same may apply to the second anchoring means.

The configurations of the (respective) anchoring means may differ by different mechanical tensions, in particular belt tensions and/or by different positions of at least one element of the respective anchoring means, in particular with respect to a further element of the anchoring means and/or a further element outside the anchoring means, for example the child seat and/or installation location.

At least one first fastening means may be provided for fastening the first anchoring means to the vehicle and/or the base, the first fastening means preferably blocking the second anchoring means (indirectly or directly)—optionally at least one second fastening means of the second anchoring means (indirectly or directly)—in a first position and preferably not blocking it in a second position.

In embodiments, a tension application device, in particular a belt tensioning device, is associated with the first (upper) anchoring means, for applying a (mechanical) tension to the anchoring means, in particular when anchoring it (producing the anchorage). If the first (upper) anchoring means comprises a belt (section), the first and the second configuration of the first (upper) anchoring means may additionally be advantageously coupled to a (minimum) tension of the belt (section). Further preferably, the (minimum) tension cannot be provided by the weight force of the first (upper) anchoring means alone.

In embodiments, the first (upper) anchoring means may comprise a (particularly manually operable) belt tensioning device. In the simplest case, this can be a friction-based, (purely) mechanical solution (known from harness belts or even backpacks). Ratchets or other designs are also conceivable. By means of the belt tightening device, the belt (section) of the first (upper) anchoring means can be tightened when the first (upper) anchoring means attaches the child seat to the vehicle (or the seat unit to the base or the vehicle) or when the first (upper) anchoring means prevents the transition of the second (lower) anchoring means from its first into its second position (configuration) (and interacts, for example, with the guide element or the belt guide of the second (lower) anchoring means). Thus, for example, a necessary (minimum) tension can be applied.

The above-mentioned object is further solved by a motor vehicle with a seat of the above type.

The above-mentioned object is further solved by using a first anchoring means of a child seat, in particular of the above type, for (indirectly or directly) blocking an anchoring or anchoring possibility of a second anchoring means of the child seat. Preferably, the first anchoring means is an upper anchoring means and the second anchoring means is a lower anchoring means. Alternatively, the first anchoring means may form a lower anchoring means and the second anchoring means may form an upper anchoring means.

The above-mentioned object is further solved by a method for installing a child seat, in particular of the above type, in a motor vehicle, in particular of the above type, wherein the child seat comprises a first anchoring means for anchoring the child seat (to the vehicle) and/or a seat unit of the child seat (to a base) and a second anchoring means for anchoring the child seat (to the vehicle) and/or a seat unit of the child seat (to a base), wherein the first anchoring means preferably forms an upper anchoring means and the second anchoring means preferably forms a lower anchoring means (or vice versa the first anchoring means forms a lower anchoring means and the second anchoring means forms an upper anchoring means), wherein the second anchoring means is (will be) initially blocked such that anchoring thereof is (will be) prevented, whereby then a configuration change of the first anchoring means takes place such that anchoring of the second anchoring means is no longer prevented.

Further embodiments of the invention will be apparent from the sub-claims.

In the following, the invention will be described with reference to an exemplary embodiment, which will be explained in more detail with reference to the figures.

Figure 2:
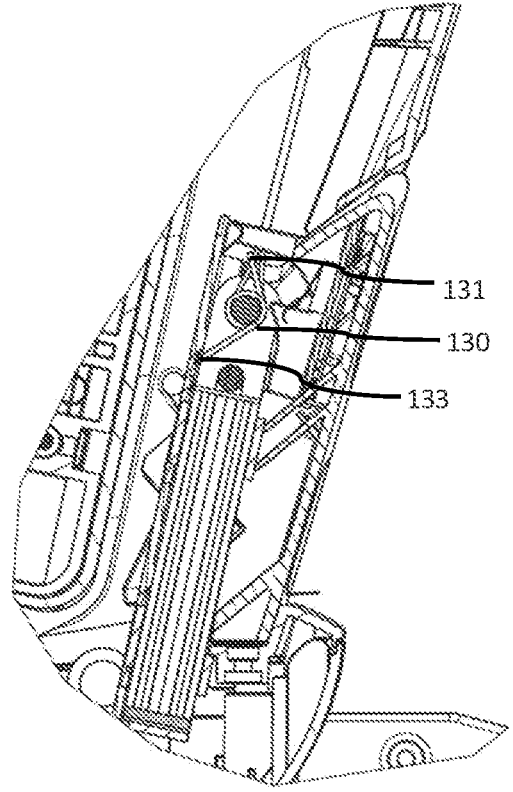
Figure 3:
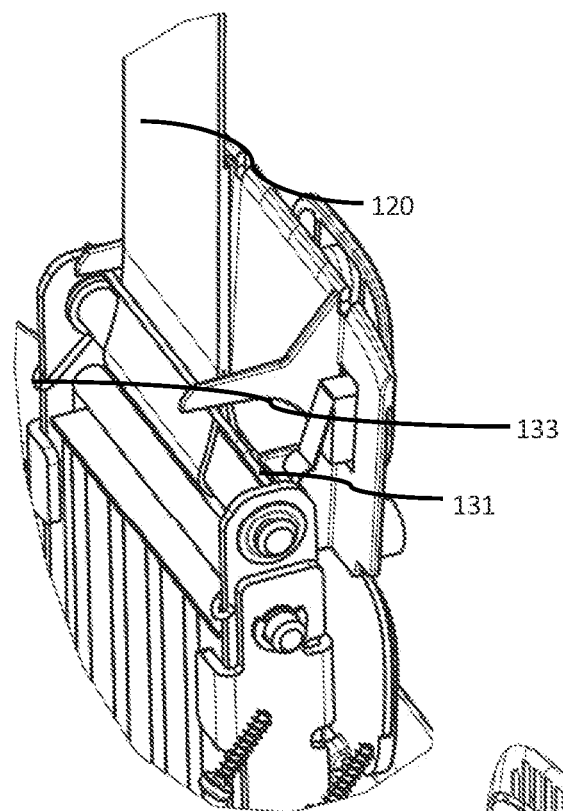
Figure 4:
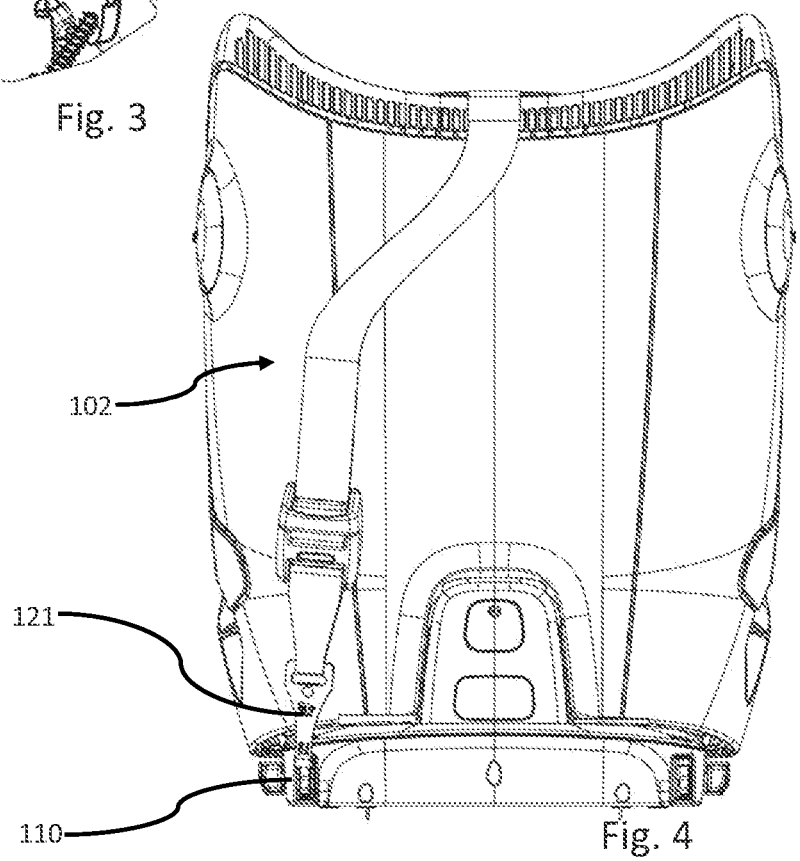
Figure 5:
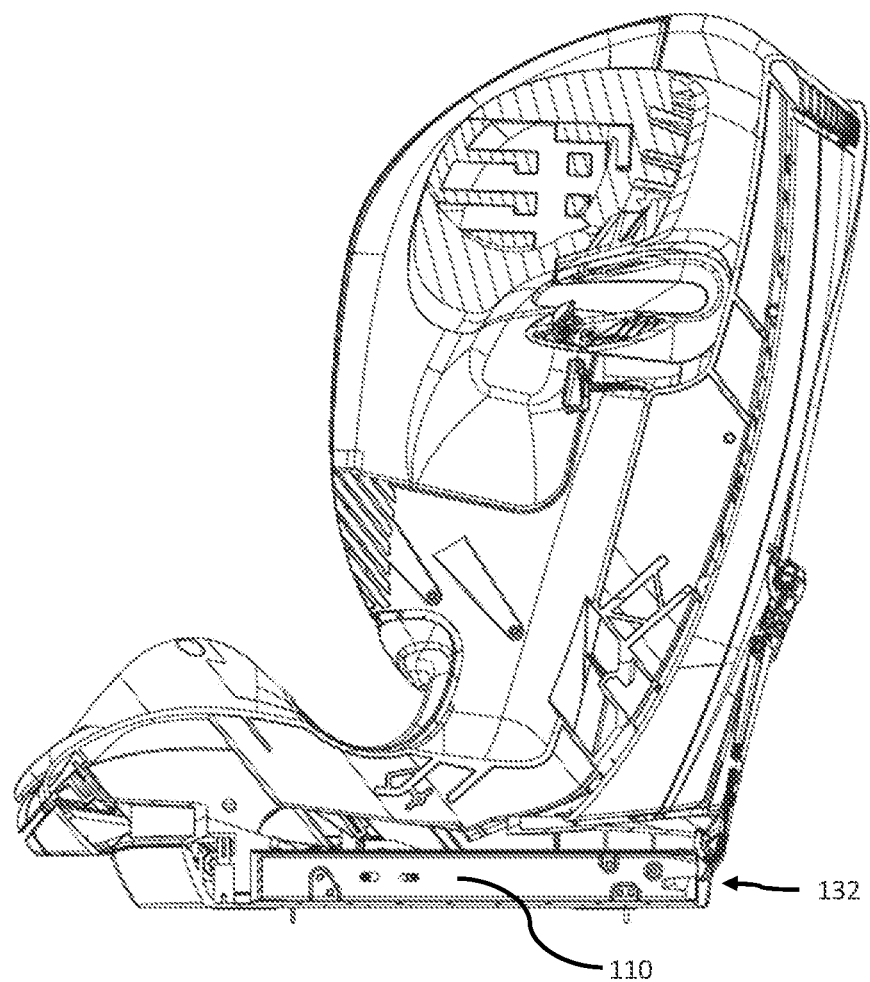
Figure 6:
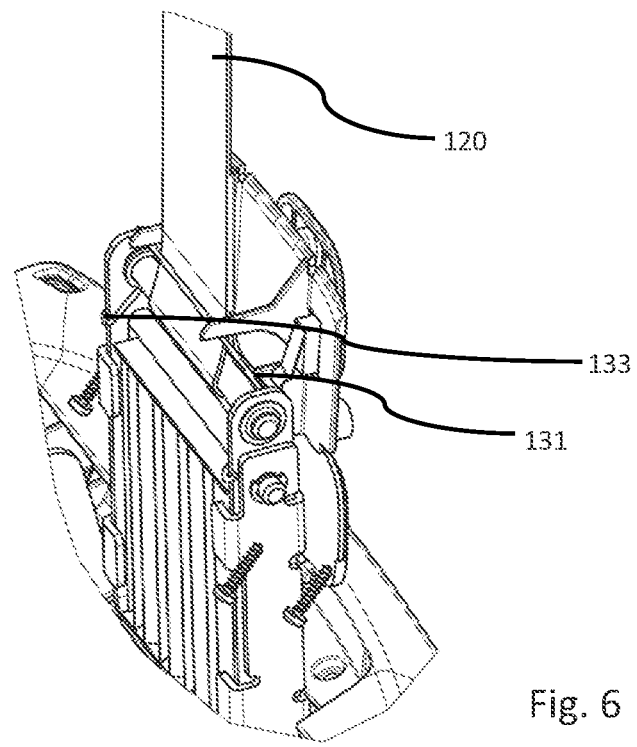
Figure 7:
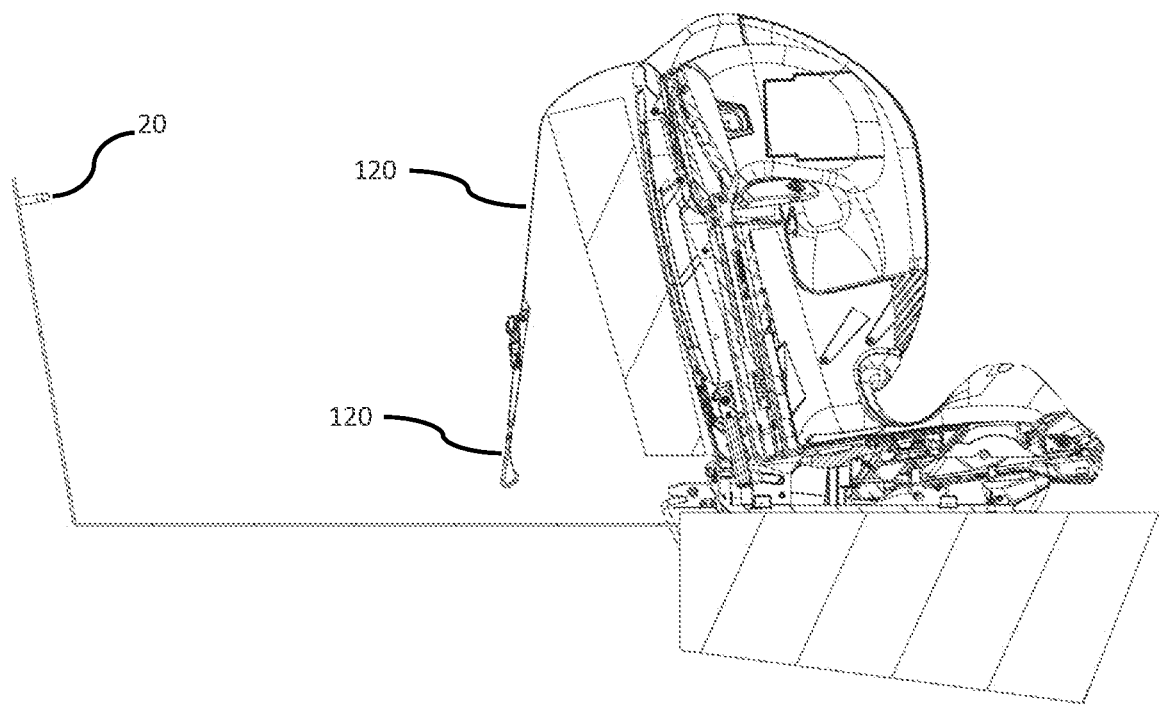
Figure 8:
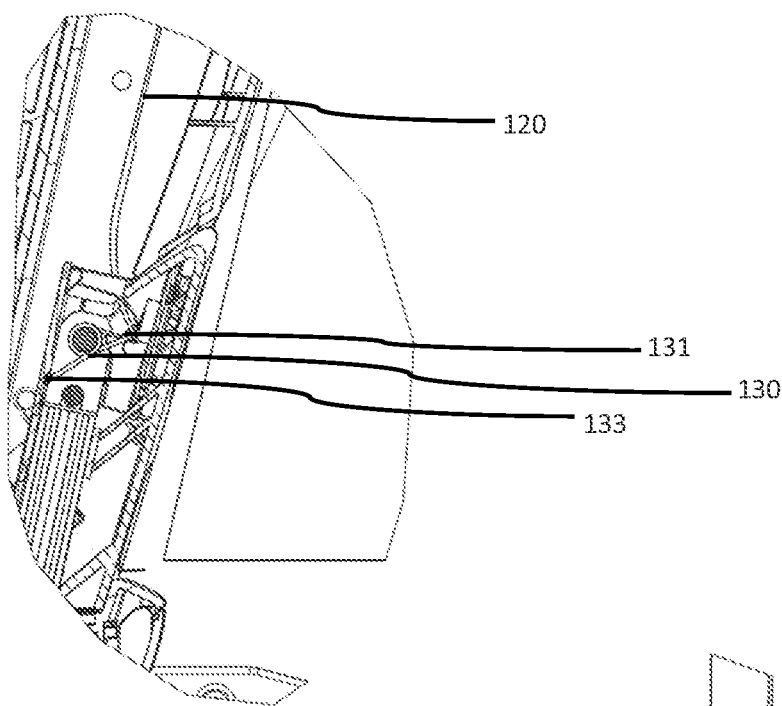
Figure 9:
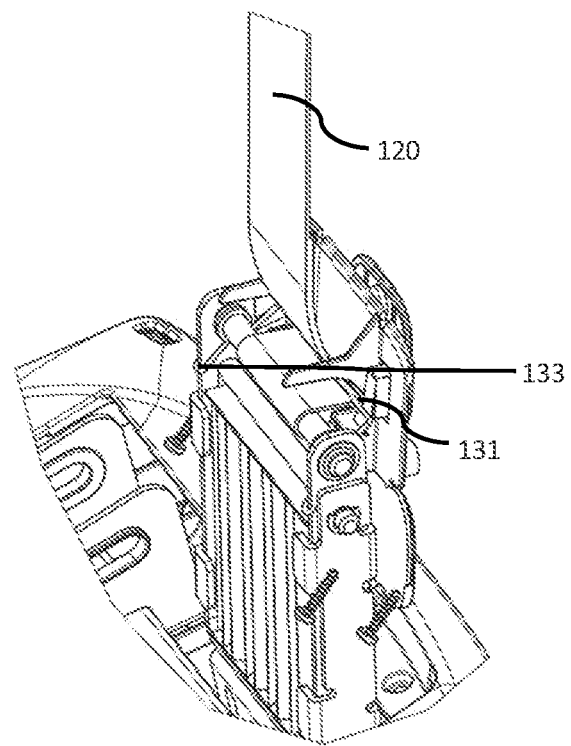

Hereby show:

FIG. 1 a side view (in section) of a child seat according to the invention on a vehicle seat;

FIG. 2 an enlargement of a section of FIG. 1;

FIG. 3 an oblique view of the section according to FIG. 2;

FIG. 4 a rear view of the child seat according to FIG. 1 in a configuration differing from FIG. 1 (without vehicle seat);

FIG. 5 a side view of the child seat according to FIG. 4 (in section);

FIG. 6 an enlarged section of FIG. 5 in an oblique view;

FIG. 7 the child seat according to FIG. 1 in a further configuration differing from FIG. 1;

FIG. 8 an enlarged section of FIG. 7;

FIG. 9 an oblique view of the section of FIG. 8.

In the following description, the same reference numerals are used for identical and similarly acting parts.

According to FIG. 1, a child seat 100 according to the invention is arranged on a vehicle seat 10. The vehicle seat has a seat surface 11 and a backrest 12. Furthermore, at least one first counterpart 20 and at least one second counterpart 21 (for acting in combination with corresponding anchoring means) are provided (on the vehicle seat or on other components of the vehicle). The counterparts 20, 21 are preferably components/structures suitable for receiving the corresponding anchoring means in such a way that the anchoring means and thus the child seat can be (safely) anchored.

The child seat 100 comprises a first section 101 (seat section), a second section 102 (backrest), a first (upper) anchoring means 120 with first fastening means 121 and a second (lower) anchoring means 110 with second fastening means 111.

According to FIG. 1, the second anchoring means may preferably be an Isofix anchorage. Alternatively, the second anchoring means may be a belt anchorage (latch system).

The first anchoring means is preferably a top tether. This can be arranged, for example, on the roof of the vehicle, on a (rear) shelf, a rear wall (as in FIG. 1) or a floor (of a rear compartment).

The first anchoring means (120) is configured such that it can assume at least a first and a second configuration, wherein when the first configuration is assumed by the first anchoring means (120), an anchorage (anchoring possibility) of the second anchoring means (110) is blocked.

FIGS. 4-6 show the first configuration of the first anchoring means 120, FIGS. 1-3 show the second configuration of the first anchoring means 120 and FIGS. 7-9 show a third configuration of the first anchoring means 120.

In the second configuration according to FIGS. 1-3, the first anchoring means 120 is fixed to the vehicle via the fastening means 121. As a result, the first anchoring means 120 (e.g. a belt or belt section thereof) is under (mechanical) tension. This has the effect of preloading a spring 130 (see FIGS. 2 and 3). As a result, a movable element 131 (here, for example, as part of the spring or integrally formed therewith, optionally in the form of a bracket or comprising a bar) is brought into a certain position which deviates from the rest position (as shown, for example, in FIGS. 8 and 9). This displacement can now be detected accordingly (for example by a contact switch and/or pressure switch, for example acting in combination with the movable element 131 and/or acting in combination with a, in particular stationary, spring support section 133 of the spring) (not shown in detail). In this respect, it can be determined via a corresponding sensor device whether the first anchoring means 120 is under mechanical tension. Specifically, this may result in no indication (e.g. acoustic alarm and/or light signal). In contrast, in the tensionless position according to FIGS. 7-9, a corresponding indication (alarm and/or optical signal) may occur, so that the user recognises that a certain configuration of the first anchoring means is assumed here (namely the third configuration). Furthermore, it can be seen that the second anchoring means 110 can have an anchoring effect or form an anchorage in the second configuration according to FIGS. 1-3 (specifically in cooperation with the second counterpart 21). Therein, the second configuration corresponds to a use configuration.

In the first configuration of the first anchoring means 120 (see FIGS. 4-6), the first anchoring means is also under (mechanical) tension as it is arranged, specifically (as an optional feature) hooked, on a lower end 132 of the backrest (second portion) 102. Thus, the first and second configurations have in common that in both configurations the first anchoring means 120 is under (mechanical) tension, but differ in that in the case of the first configuration the anchoring means 120 is held at the child seat (specifically the lower end 132) and in the case of the second configuration it is held (only) externally (e.g. to an anchoring point of the vehicle) with respect to the child seat.

Furthermore, it can be seen in FIG. 5 that the first anchoring means 120 blocks a travel path of the second anchoring means 110 (specifically, an (Isofix) arm of the second anchoring means 110) so that it cannot reach the position according to FIG. 1 and thus cannot establish anchorage with the second counterpart 21. Thus, the second anchoring means 110 is blocked in the first configuration of the first anchoring means 120.

In the third configuration according to FIGS. 6-9, in turn, the fastening means 121 of the first anchoring means 120 is free (i.e. held neither on the vehicle nor on the child seat), so that the spring (device) 130 assumes a different position (deviating from FIGS. 1-6). This deviating position can then also be detected accordingly so that, for example, an indication (alarm and/or visual indication) recognisable to the user can occur. The third configuration of the first anchoring means 120 thus differs from the first configuration and the second configuration in particular in that the first anchoring means is not under any (sufficient) (mechanical) tension (which is associated with the additional difference that the first fastening means 121 of the first anchoring means 120 is free).

In summary, therefore, according to the embodiment:

First configuration: first anchoring means under tension (or tension greater than or equal to threshold); second anchoring means is blocked.

Second configuration: first anchoring means under tension (or tension greater than or possibly, in a first alternative, equal to threshold value); second anchoring means is not blocked.

Third configuration: first anchoring means not under tension (or tension lower or possibly, in a second alternative, equal to threshold value); second anchoring means is not blocked.

At this point, it should be noted that all the parts described above, considered alone and in any combination, in particular the details shown in the drawings, are claimed as being essential to the invention. Modifications thereof are familiar to those skilled in the art.

LIST OF REFERENCE SIGNS

10 Vehicle seat
11 Seat surface
12 Backrest
20 First counterpart
21 Second counterpart
100 Child seat
101 First section
102 Second section
110 Second (lower) anchoring means
111 Second fastening means
120 First (upper) anchoring means
121 First fastening means
130 Spring
131 Movable element (bracket)
132 Lower end
133 Spring support section

The invention claimed is:

1. A child seat for attaching to a motor vehicle seat, comprising:
   a first anchoring means for anchoring the child seat or a seat unit of the child seat and a second anchoring means for anchoring the child seat or the seat unit of the child seat,
   wherein the first anchoring means forms an upper anchoring means and the second anchoring means forms a lower anchoring means, or the first anchoring means forms a lower anchoring means and the second anchoring means forms an upper anchoring means,
   wherein the first anchoring means is configured such that it can assume at least a first and a second configuration, wherein when the first anchoring means assumes the first configuration, an anchoring of the second anchoring means is blocked.

2. The child seat according to claim 1,
   wherein
   the first anchoring means is configured such that it can assume a third configuration, wherein in said third configuration of said first anchoring means an anchoring of said second anchoring means is not blocked, or
   wherein the second anchoring means is configured such that it can assume at least a first and a second and optionally a third configuration, wherein in the third configuration of the second anchoring means an anchoring of the second anchoring means is enabled.

3. The child seat according to claim 1,
   wherein
   the first or a third configuration of the first or second anchoring means is a non-use configuration or
   the second configuration of the first or second anchoring means is a use configuration.

4. The child seat according to claim 1,
   wherein
   the first anchoring means comprises a belt or a top tether with a belt, or the second anchoring means comprises an anchorage with at least one anchoring arm or a belt anchorage for a latch system.

5. The child seat according to claim 1,
   wherein
   sensor means, including at least one contact switch or a toggle switch, are provided for determining whether the first or the second anchoring means are in the first or second or a third configuration.

6. The child seat according to claim 1,
   wherein
   an alarm device is provided which is configured to generate an alarm when the first anchoring means is in a third configuration, which is configured as a non-use configuration.

7. The child seat according to claim 1,
   wherein
   the first or second anchoring means are configured to anchor the child seat to the vehicle or
   the child seat comprises the seat unit and a base, wherein the first or second anchoring means are configured to anchor the seat unit to the base, or wherein the first or second anchoring means are configured to anchor the base to the vehicle.

8. The child seat according to claim 1,
   wherein
   the configurations of the respective anchoring means differ by different mechanical tensions or belt tensions, or differ by different positions of at least one element of the respective anchoring means or with respect to a further element of the anchoring means or a further element outside the anchoring means or the child seat or installation location.

9. The child seat according to claim 1,
   wherein
   at least one first fastening means is provided for fastening the first anchoring means to the vehicle or the base,
   wherein the first fastening means in a first position indirectly or directly blocks the second anchoring means and does not block it in a second position.

10. The child seat according to claim 1,
    wherein
    a tension application device, in particular a belt tensioning device, is associated with the first anchoring means for applying a tension to the anchoring means, or when the latter is anchored.

11. A motor vehicle comprising a child seat according to claim 1.

12. Use of a first anchoring means of a child seat according to claim 1, for influencing or blocking, a second anchoring means of the child seat,
    using the first anchoring means to form the upper anchoring means and using the second anchoring means to form the lower anchoring means, or using the first anchoring means to form the lower anchoring means and using the second anchoring means to form the upper anchoring means.

13. A method of installing a child seat in a motor vehicle according to claim 1, wherein the child seat comprises:
the first anchoring means for anchoring the child seat or a seat unit of the child seat, and the second anchoring means for anchoring the child seat or a seat unit of the child seat,
and wherein the method comprises:
using the first anchoring means to form the upper anchoring means and using the second anchoring means to form the lower anchoring means, or using the first anchoring means to form the lower anchoring means and using the second anchoring means to form the upper anchoring means,
wherein the second anchoring means is initially blocked in such a way as to prevent anchoring thereof, whereby then a change in configuration of the first anchoring means is effected so that anchoring of the second anchoring means is no longer prevented.

* * * * *